Figure 1:
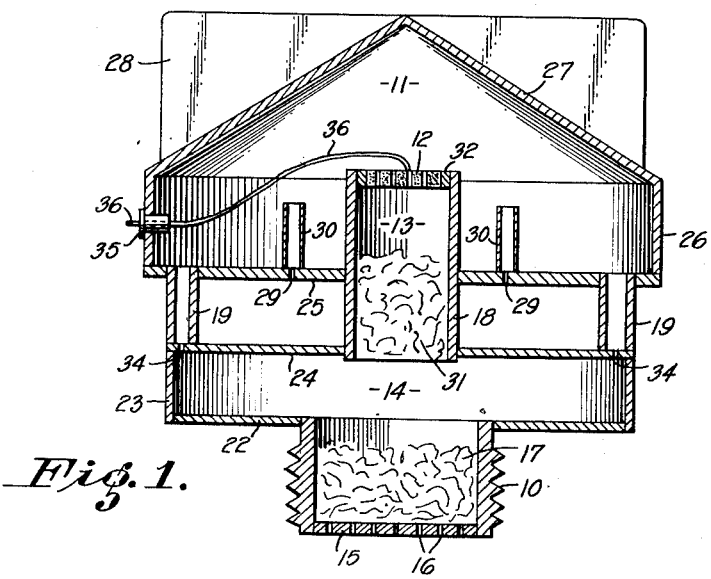

Oct. 21, 1952 — P. H. CRAIG — 2,615,062
STORAGE BATTERY CAP WITH GAS RECOMBINING MEANS
Filed May 3, 1949

INVENTOR.
PALMER H. CRAIG
BY Ralph B. Stewart
ATTORNEY

Patented Oct. 21, 1952

2,615,062

UNITED STATES PATENT OFFICE 2,615,062

STORAGE BATTERY CAP WITH GAS RECOMBINING MEANS

Palmer H. Craig, Coral Gables, Fla.

Application May 3, 1949, Serial No. 91,197

8 Claims. (Cl. 136—179)

This invention relates to rechargeable storage batteries generally, and in particular to a battery accessory in the form of a special cap for an ordinary storage battery (such as an automobile battery of the acid type) which can be screwed on to the battery after removal of the usual filling cap with which the battery is normally equipped. The special cap may be separately manufactured and separately sold.

The object of the invention is to cause the battery to replenish its own water, thus eliminating the necessity for refilling the battery at intervals. This is made possible by so mounting and housing a catalyst in the cap that hydrogen and oxygen gases evolved from the battery electrolyte during recharging will, whether the battery was designed with this in mind or not, re-combine into water vapor which will condense on the walls of a condensing chamber and will trickle back into the battery electrolyte. By my invention less than five per cent of the evolved gases are lost to the atmosphere and it has been found that a normal battery can be used twenty months or more without refilling— that is, practically the full life of the battery.

Although the cap is preferably of the removable type, interchangeable with the ordinary filling cap, it may instead be permanently attached to the outside of the battery, or it may be a unit supported within the battery container provided it is so supported as to provide efficient heat transfer from the catalyst to the air outside the battery. By rapidly conducting away the heat due to catalytic action, no portion of the catalyst is permitted to reach the ignition temperature of the gases, and thereby the danger of explosion is removed.

It is an important object of the invention, therefore, to control the heat conditions within the catalyst chamber, and in particular to provide for rapid heat transfer, during charging, from the catalyst to the outer wall of the cap and effective heat dissipation from the cap to the atmosphere.

An object of the invention is to so mount and house the catalyst that it will be kept free from contact with battery gases such as stibine which might poison its surface and seriously impair its catalystic action.

Another object is to so design the condensing surfaces within the catalyst chamber that the catalyst will be protected against dripping of the condensed moisture upon it.

Another object is to provide special means for heating the catalyst, during non-charging periods, so that it can be dried in the event moisture condenses upon it after it has cooled off.

A still further object is to protect the cap and the catalyst chamber within it against the entry of acid fumes or finely divided moisure entrapped in the stream of evolved gases.

A specific object is to provide a water seal within the cap that permits condensed water to accumulate and drip back to the battery cell while preventing the gases from entering the condensing chamber except through the catalyst chamber.

Another specific object is to establish communication from the catalyst chamber direct to the outside air by means of ports in the chamber wall located so that the evolved gases must pass over the catalyst before they reach the ports.

The invention is disclosed in connection with the drawing in two embodiments both of which are represented as having screw threaded bases for screwing the unit into the usual filling hole of a storage battery.

Fig. 1 is a sectional view of the preferred form of cap, taken along a vertical plane passing through the center of the cap wherein the cap is formed of separated upper and lower chambers connected centrally by a gas inlet tube upon which the catalyst is mounted within the upper chamber; the two chambers being connected peripherally by a set of water return tubes. Although only two water return tubes are shown, it is to be understood that any desired number of tubes may be provided and the tubes may be spaced around the periphery of the chambers in any desired manner.

Figure 2:
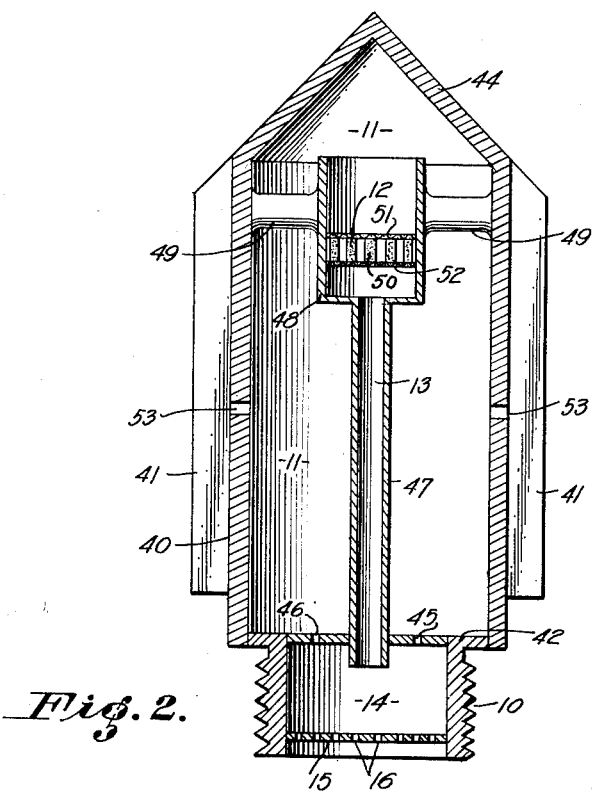

Fig. 2 is a sectional view similar to Fig. 1 but showing a different embodiment, that of an elongated cap having a single chamber divided by a partition into upper and lower portions that serve the same general purpose as the separate upper and lower chambers of Fig. 1. There are no extra water return tubes in Fig. 2; the water trickles down the whole inner surface of the upper or catalyst chamber and passes through perforations in the partition.

In both Figs. 1 and 2, the cap has a screw-threaded base 10 and is provided with an upper or condensing chamber 11 within which a catalyst will be in the path of gases rising through gas inlet passage 13 from a lower chamber 14. The base of the cap is closed by a perforated protective plate 15 of any suitable acid resistant material to prevent the entry into gas inlet 13 of acid fumes, or finely divided moisture entrained with the gases. The holes 16 in plate 15 permit the passage of gas upward into chamber 14, and of condensed water downward from chamber 14 into the battery cell. However, acid vapors from the battery cell that strike the plate are prevented from being carried through the plate in any appreciable quantity, the liquid on the plate acting as a water trap for the acid vapor.

As shown in Fig. 1, a mass of glass wool 17, the use of which is preferred, is placed above plate 15 to receive the condensed moisture from the catalyst chamber and to become saturated therewith, thus adding to the water trap effect and serving as a temporary reservoir for the returned water.

In Fig. 1 the upper or condensing chamber 11 is spaced vertically above the lower chamber 14 and the two chambers are connected by a central tube 18 which provides the gas inlet passage 13 to the catalyst unit. The two chambers are also connected at their peripheries by a number of spaced water-return tubes 19. Condensing chamber 11 preferably is formed of metal to provide good heat radiating capacity. Monel metal has been found suitable; also stainless steel, or the fins may be made of metal molded into a plastic case. The central communicating tube 18 is preferably made of copper, or of a material having a copper internal surface, for a reason that will be explained hereinafter. The water return tubes 19 may conveniently be made of metal or plastic.

As shown in Fig. 1, the lower chamber 14 is formed of a lower annular plate 22, a short cylindrical wall 23 and a perforated annular upper plate 24. The screw-threaded base 10 is supported in the central opening of plate 22, and the lower end of tube 18 is mounted in the central opening of plate 24. The upper chamber 11 is provided by a lower perforated disc 25, a short cylindrical wall 26 and a domed or conically shaped top wall 27, the latter having radially arranged external cooling fins 28. Tube 18 extends upwardly from plate 24 and projects through a central hole in plate 25 into the upper chamber 11. The small tubes 19 are mounted at their upper ends in holes formed in plate 25. The lower ends of these tubes are sealed to plate 24 and surround smaller holes 34, about $\frac{1}{32}$ inch in diameter, in plate 24, to permit water entering the tubes to seal the holes 34 and collect on the ledges about them until a small head of water, about ¼ to ½ inch deep, is accumulated which is heavy enough to overcome the surface tension effect and let the water run through. This water seal tends to make all the evolved gases go through tube 18 and also keeps gases that have passed into the catalyst chamber from leaking back through tubes 19.

A plurality of ports 29 (about 0.04" dia.) in plate 25 connect chamber 11 with the atmosphere. Vertical tubes 30 around holes 29 prevent the leakage of water from the condensing chamber through these holes. A mass of copper 31, such as copper wool, is located within the tube 18 in gas inlet passage 13, so that the rising gases entering cap 10 pass through the copper, and in so doing lose part or all of their stibine content. The copper in the internal surface of tube 18 also causes the stibine to decompose. Since the tendency of stibine to decompose is greater with increased heat, and heat is present in the catalytic chamber and its associated metal parts while the battery is being charged, it is clear that stibine gas does not reach the catalyst in sufficient amount to poison its surface or otherwise impair its catalytic action.

In the catalyst unit 12, which is represented diagrammatically in Fig. 1, the catalyst, which may be palladium sponge or palladium black, or any other suitable material, is mounted in a metal ring 32, supported within the upper end of metal tube 18. The disk within ring 32 may be formed of a suitable catalyst material mixed with metal dust, to conduct the heat to the outer surface of the cap, or it may be a carbon disc treated with catalyst. Good results were obtained with a carbonized nickel plate with the catalyst deposited on the carbon. To facilitate the dissipation of heat the catalyst disc may be enclosed between metal screening or perforated discs of any suitable heat conducting material. In Fig. 2, for example, a layer of catalyst pellets is clamped between two disks of metal screening and the heat is conducted from the catalyst through the metal screening to the metal gas inlet tube and the supporting struts, thence to the cap casing and the external radiating fins.

It will be understood that the catalyst unit 12 is either porous or is perforated so that gases may pass through the unit from passage 13 into condensing chamber 11.

At certain times moisture may collect on the catalyst unit, as during non-charging periods, and it is desirable to provide for heating the unit to drive off the moisture. For this purpose a conductor 36 may be brought into the condensing chamber through an insulator 35 to electrically heat the unit.

The exact method of supplying heat for drying is not material to the invention. The current may be led directly through the catalyst material, or through the carbon disk is that is used, or it may be passed through a heating conductor wrapped around the catalyst or lying against the catalyst surface. The return conductor for the heating circuit may be connected to the metal condensing chamber. Normally a switch, operated manually or otherwise, will be connected in circuit with conductor 36 so as to turn on the drying current at will. However, if the catalyst within unit 12 (or a material mixed with it) has the characteristic of an extremely high resistance when dry and a greatly decreased electrical resistance when wet, conductor 36 may connect the current source permanently to the heating circuit for catalyst unit 12; then the drying current will automatically start to flow when the catalyst gets wet and will automatically stop flowing when the catalyst dries out.

The source of heating current may be separate from the storage battery having the cap but it is obvious that the storage battery itself may be tapped to supply the necessary current.

The dome shape of condensing chamber 11 of the cap is an important feature of the cap. The dome is preferably conical but other shapes may be used, provided the condensing surface is large and so shaped as to lead the condensed water away from the catalyst unit 12 so that it will not drip on the catalyst. The internal surface of the condensing chamber may be lined, e. g. with cloth or wire netting, so that the condensed moisture will be led away before it forms large enough drops to drip onto the catalyst.

The operation of the device is as follows: When the battery is on charge the gases evolved by electrolysis rise to the top of the battery container carrying with them acid fumes and impurities which upon direct contact with the catalyst would impair the catalytic operation and decrease the amount of condensed water that is returned to the cell. Wetting of plate 15 by the acid below or by condensed water accumulated in glass wool 17 or that lying on top of plate 15 both tend by surface tension to seal the openings 16 against the acid fumes without preventing passage of the rising gas. Acid vapor that does get through is trapped in the condensed water and returns with it to the cell.

The gases freed of acid vapor pass from chamber 14 into gas inlet 13. If stibine is present it is decomposed by the copper in the passage (the copper surface of tube 18 or that of the mass 31) and by the effect of the heat of catalytic action produced in the catalyst chamber. The decomposed hydrogen from the stibine gas passes on with the evolved gases, eventually to be absorbed by surfaces with an affinity for hydrogen or to be vented out by way of ports 29. The antimony from the stibine is deposited harmlessly on the wall of tube 18 or adjacent surfaces.

The gas stream, now free of acid and stibine, reaches the catalyst, and here the hydrogen and oxygen combine, with the evolution of heat, into water vapor that condenses on the cooler walls of the condensing chamber 11. The heat is carried rapidly away from the catalyst and its mounting (metal dust or carbon, metal screening, if present, ring 32 of unit 12) tube 18 and metal parts of the cap to the cooling fins 28. The condensed moisture trickles down the walls of the dome 27 and down the cylindrical walls 26 and other surfaces upon which it deposits to the surface of plate 25, thence by way of water return tubes 19 to the circular ledges around holes 34 in plate 24. The condensed water seals these holes by surface tension but when a small head of water accumulates the force of gravity causes it to overcome the forces of adhesion at holes 34, and to drop back into chamber 14, thence to the top of plate 22 and by way of glass wool 17, if it is used, to the water trap on plate 15. The water then leaks back into the battery cell carrying with it any small amounts of acid dissolved in the water trap.

The water which has trickled onto plate 25 or condensed there would tend to seal the ports 29 if protective sleeves 30 were not present. These ports are thus kept open for the escape of excess gases which do not recombine into water. The proportion of gas which escapes when the cap of this invention is used to that which escapes when the catalyst cap is not used has been found to be about one to twenty.

Ports 29 serve the additional purpose of keeping the catalyst chamber in communication with the atmosphere during non-charging periods when the catalyst cools and may become wet due to condensed moisture. With the chamber open to the atmosphere the catalyst is dried by the heating current supplied to the heating circuit through conductor 36, thus restoring the effectiveness of the catalyst surface.

Referring to Fig. 2, the cap is made as a unitary structure having an elongated cylindrical wall 40 with external fins 41 and an internal shoulder or ledge 42 surrounding the inlet passage 14 through base 10. The cylindrical wall is provided at its upper end with a conical cover portion 44 the inner surface of which is the main condensing surface for the recombined moisture. The lower end of the cap is closed by plate 15 having holes 16 which form a water trap similar to that described for Fig. 1. A centrally apertured disk or plate 45 having a number of small holes 46 serves as a partition to divide upper chamber 11 from lower chamber 14, and acts, as do the circular ledges around holes 34 in the water return tubes 19 of Fig. 1, to collect the condensed water and return it to chamber 14 and through water trap plate 15 to the battery cell.

The gas inlet tube 47 is mounted so that its lower end projects down slightly below the level of plate 45 into chamber 14 so that returning water will not be caught here and carried up into tube 47. The upper end of tube 47 carries a metallic cup 48 within which the catalyst unit 12 is mounted. The catalyst cup 48 is supported from walls 40 by radial arms or struts 49 of metal or other heat conducting material.

As indicated hereinbefore, the catalyst unit 12 of Fig. 2 may be of any suitable type which will get rid of the heat of catalytic action rapidly. As shown, it comprises a layer 50 of catalyst pellets held between a pair of disks 51, 52 of wire screening or perforated metal such as copper, and it is mounted in good heating conducting relation with the cup 48 so that heat will be transmitted efficiently from the catalyst through its mounting cup 48, struts 49, cylindrical wall 40 and cooling fins 41 to the outer air.

Ports 53 in the wall 40, preferably arranged at a level lower than that of the catalyst, provide communication between the catalyst chamber and the atmosphere and serve the same function as the ports 29 in Fig. 1, and are about the same size as ports 29.

Although Fig. 2 does not show heating means to dry the catalyst, nor glass wool in the passage 14, nor copper wool in the passage 13, it is obvious that these expedients may be used with the device of Fig. 2 as well as with that of Fig. 1.

The tube 47, or at least its internal surface, is preferably made of copper to facilitate the decomposition of stibine gas if any is present. The tube may be shortened if copper wool is used in passage 13.

The operation of the device of Fig. 2 is similar to the device of Fig. 1. When the cap is screwed into the battery container, or fastened permanently thereon or mounted therein, gases evolved by the charging current rise from the electrolyte through water trap 15 where entrained acid is separated out or dissolved in the water trap. The gases pass through tube 47 and catalyst 50 to condensing chamber 11, and stibine is decomposed by the copper in the tube, the decomposition being facilitated by heat from the catalyst chamber. In chamber 11 excess gases are vented out through ports 53 but the ports are so placed that the gas stream must pass over the catalyst before it reaches the vents. The hydrogen and oxygen recombine into water vapor which condenses and runs down the conical and cylindrical walls to ledge 42 and collects on plate 45; when a thin layer of accumulated water provides enough head to overcome the water seal, the water drops into passage 14 and through water trap 15 to the battery cell.

What I claim is:

1. A water replenishing device for a storage battery comprising a cylindrical base member, a second cylindrical member having a domed top wall and heat dissipating structure external thereto, a gas inlet member mounted between said cylindrical members, a catalyst mounted within said second cylindrical member and a plurality of water return tubes connected from said second cylindrical member to said first cylindrical member at spaced intervals about the peripheries of said cylindrical members.

2. An elongated cap structure for storage batteries, said cap containing a catalyst and comprising a generally cylindrical casing having a screw threaded base portion of reduced diameter, a pair of apertured water sealing disks in said casing within said base portion of reduced diameter, a copper gas inlet tube mounted in said casing and passing through the upper disk so that the upper end of the tube projects above the upper disk and supports said catalyst, and its lower end projects below said upper disk and terminates above said lower disk.

3. A battery cap for the casing of an acid electrolyte type storage battery, designed to replace the normal battery filling cap, said cap comprising an attaching base and a housing above said base, means for supporting within said housing a catalyst designed to operate at temperatures below glowing to accelerate the recombination into water vapor of dissociated gaseous constituents rising from said battery past said catalyst, vertically extending wall means within said housing dividing said housing into two vertically extending channels through the first of which gases from said battery are guided past said catalyst and through the second of which said recombined vapors are guided in a generally downward direction on their return to the battery, said base providing a common passageway for the flow of gases from the battery into said first mentioned channel and for the flow of catalytically condensed water vapor through said second mentioned channel, said housing having an extended heat dissipating outer surface large enough to dissipate heat in quantities sufficient to prevent said gases reaching ignition temperatures during charging of the storage battery.

4. The combination according to claim 3 in which said vertically extending wall means has a copper containing surface forming part of said first mentioned channel, for removing stibine carried in the gas stream before the gases reach said catalyst.

5. The combination according to claim 3 in which said second channel is provided with a water return outlet having at least one perforated water plate, the dimensions of the perforations being so small as to produce a water seal for the casing that permits outlet of the condensed recombined water to the battery without permitting the leakage of gas from the battery cell through said perforations.

6. A water replenishing cap for a storage battery, said cap containing a catalyst of the type that accelerates the recombination of hydrogen and oxygen gases into water vapor at temperatures below their ignition temperatures, said cap including communicating upper and lower chambers in the upper of which the catalyst is mounted on a support, and into the lower of which the condensed water vapor falls, said upper chamber having a domed condensing surface at the top of the cap above said catalyst and said lower chamber including means for holding said cap tightly in position, said domed condensing surface having a heat dissipating outer surface and being connected to said catalyst support so that it provides for the rapid dissipation of heat from said catalyst support to said outer surface at a rate sufficient to keep the temperature of the catalyst below the ignition temperature of the gases during charging of the battery.

7. The combination according to claim 6 in which communication between the upper and lower chambers for incoming gases is provided by a central inlet tube, and a path for the return of condensed water is provided by a water sealing plate having apertures small enough to cause the accumulation of water on the upper surface of said sealing plate until a sufficient head of condensed water has collected to cause the water to drop into said lower chamber.

8. A catalyst container for an acid electrolyte battery comprising a housing which forms communicating upper and lower chambers, said housing containing partition means that divide said housing vertically to provide two channels for upward and downward fluid flow, respectively, through one of which channels gas is guided from said battery to said upper chamber and through the other of which channels condensed water vapor is returned to said battery via said lower chamber, a perforated, water-seal plate extending substantially horizontally between said upper and lower chambers across said downward fluid flow channel, whereby accumulated condensed water vapor on said plate prevents evolved gases from the battery from rising into said lower chamber and prevents uncombined gases in said upper chamber from leaking back into said lower chamber.

PALMER H. CRAIG.

REFERENCES CITED

The following references are of record in the file of this patent:

UNITED STATES PATENTS

| Number | Name | Date |
| --- | --- | --- |
| 1,770,974 | Everett | July 22, 1930 |
| 1,861,789 | Davis | June 7, 1932 |
| 2,051,039 | Guthrie | Aug. 18, 1936 |
| 2,465,202 | Craig | Mar. 22, 1949 |

FOREIGN PATENTS

| Number | Country | Date |
| --- | --- | --- |
| 303,799 | Great Britain | Apr. 8, 1930 |
| 339,824 | Great Britain | Dec. 18, 1930 |

OTHER REFERENCES

Mellor, "Comprehensive Treatise on Inorganic and Theoretical Chemistry," vol. 9, 1929, page 398, last paragraph.